United States Patent [19]

Colburn

[11] Patent Number: 4,777,755

[45] Date of Patent: Oct. 18, 1988

[54] PORTABLE HUNTING BLIND AND SHELTER

[76] Inventor: James A. Colburn, 5525 Duvall St., Pensacola, Fla. 32503

[21] Appl. No.: 140,618

[22] Filed: Jan. 4, 1988

[51] Int. Cl.$^4$ .......................................... A01M 31/02
[52] U.S. Cl. ................................................ 43/1
[58] Field of Search ................................. 43/1

[56] References Cited

U.S. PATENT DOCUMENTS

| 2,159,273 | 5/1939 | Killinger | 43/1 |
| 3,874,398 | 4/1975 | Hendrickson | 43/1 |
| 4,171,595 | 10/1979 | Tucker | 43/1 |
| 4,186,507 | 2/1980 | Stinnett | 43/1 |
| 4,364,193 | 12/1982 | Visco | 43/1 |

Primary Examiner—M. Jordan
Attorney, Agent, or Firm—John K. Donaghy

[57] ABSTRACT

There is provided a hunting blind comprising an upper frame including a peripheral frame structure, top reinforcing side members and a cross strut; gun-support bars attached to and vertically spaced from said upper frame; a bottom frame structure separably attached to said upper frame; a cover extending about said upper frame and said lower frame, said cover having a plurality of window openings, and a flap on the inside and a flap on the outside of said window openings to open or close said openings at the discretion of a hunter occupying said blind.

13 Claims, 3 Drawing Sheets

PORTABLE HUNTING BLIND AND SHELTER

BACKGROUND OF THE INVENTION

1. Field of the Invention

This invention pertains to a portable hunting blind and shelter which can be assembled and disassembled at the field location with ease and without the need for any special skills or tools.

2. Prior Art

The prior art shows various designs of tents and hunting blinds which may be used by hunters and which provide various degrees of camouflage against being detected by game.

Turner (2,737,397) shows a portable shelter comprising base sections 12, upright members 10 and roof sections 16. These frame members are covered by a canvas cover 38.

Hickman (3,132,658) discloses a collapsible portable housing base bars 3,4 and side top bars 8 connected by uprights 1, 2. These members are covered by a fabric cover 13.

Glutting (3,913,598) depicts a hunter's blind and shelter 10 comprising panels 12 hinged together by hinges 30. The panels are covered with a cover 60 and a top 58 provides the roof section.

Husted (4,067,346) shows a collapsible hunting blind having collapsible corner posts 15, 16, 17 and 18, spreader bars 19 and 20, a fabric covering 21 and flaps 49.

Compton (4,084,597) discloses a fish house having poles 63 for supporting a canvas cover having a plastic window 59.

Stinnett (4,186,507) is a portable duck blind comprising a frame 2 covered by canvas 40 having a window opening 56 covered by a flap 58.

Barker (4,265,261) describes a tent 10 having walls 14 with windows 16 having awning panels 26.

Visco (4,364,193) shows a portable blind 10 having an umbrella top 12, a a skirt 14 and bottom skirt 18. The skirt 14 has clear plastic windows 38 having gun barrel ports 40.

None of these patents show a hunting blind or shelter having an upper frame structure including a gun support bar nor adjustable window flaps which are important features of this invention.

SUMMARY OF INVENTION

There is a need for a hunting blind which is inexpensive to manufacture, portable and collapsible, and easily assembled at the hunting site.

It is, therefore, one feature of this invention to provide a hunting blind having an upper frame structure which incorporates a gun support bar which provides a means for steadying the gun during aiming and shooting, and a support for the gun during non-shooting moments.

It is another object of this invention to provide a hunting blind having a cover with window openings having outside flaps which are adjustable in height to allow optimum visibility of the game and at the same time provide decreased visibility to the game of the hunter inside the blind.

Yet another object of this invention is to provide clear plastic weathershield flaps on the inside of the window openings which are also adjustable to various positions in the window opening and which may be closed in inclement weather to protect the hunter while enabling the hunter to observe game.

These and other objects of the invention will become apparent to those skilled in the art to which the invention pertains from a reading of the following specifications when taken in light of the annexed drawings.

DESCRIPTION OF THE PREFERRED EMBODIMENT OF THE INVENTION

Figure 2:
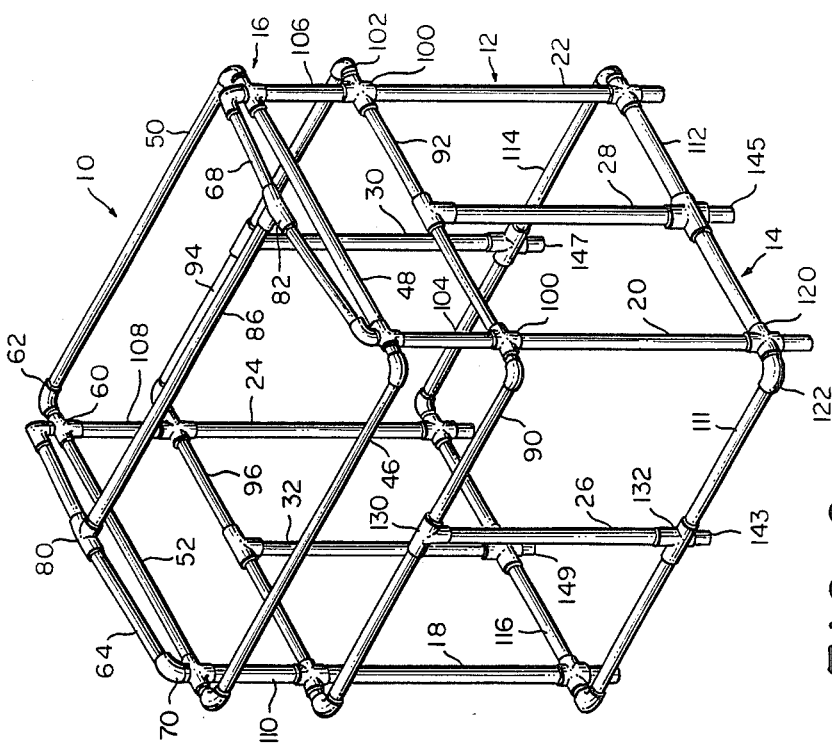
FIG. 2 is a perspective view of the frame showing the various components including the gun support bar intermediate the top support frame and the bottom frame.
Figure 1:
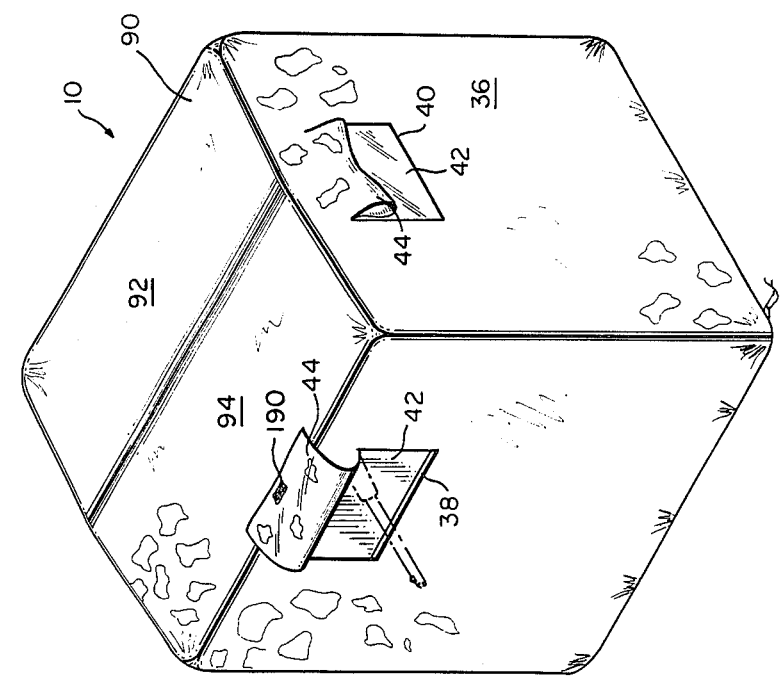
FIG. 1 is a perspective view of the hunting blind showing window openings and flaps in various stages of adjustment.

Turning now in more detail to the drawings, FIGS. 1 and 2 show a hunting blind 10, comprising a frame 12 having a separable bottom frame structure 14, and a separable upper frame structure 16. The lower and upper frame structures 14 and 16 are connected together by removable tubular corner posts 18, 20, 22 and 24. Intermediate removable tubular members 26, 28, 30 and 32 provide additional reinforcing support for the frame 10. A cover 36 of any suitable water impervious material covers the frame 10. Window openings 38, 40 are provided in the sides of the cover 36. The window openings have inside clear plastic flaps 42 and outside flaps 44.

The frame 12 comprises a top frame structure having upper tubular removable members 46, 48, 50 and 52 secured together by cross-joint tubular connectors 60 and tubular elbow members 62. It will be appreciated that the upper tubular members 48-52 are secured in the elbows 62 which are in turn connected to the crossjoints 60 to form a unitary peripherally extending one-piece frame member.

On opposite sides of this frame member are top reinforcing support tubular members 64 and 68 joined to the frame cross-joints 62 by elbow member 70. Midway along the members 64, 68 are connector T-joints 80, 82 which receive removable cross strut 86 which forms the apex of the frame 10. It will be seen that cross strut 86 is elevated above the frame members 46–52 and supports the top wall 90 of the cover 36 such that rainwater gravitates downwardly along the sides 92 and 94.

The frame members 46–52, 64 and 68, and 86 form an upper frame structure and is attached to removable gun bar supports 90, 92, 94 and 96 by cross-joint connectors 100, elbow joints 102 and vertical corner posts 104, 106, 108 and 110. The upper frame, including the gun support bars, form a single unitary frame 16 which is separable from the remainder of the frame as will be seen below.

The bottom frame structure 14 comprises removable tubular members 111, 112, 114 and 116 connected together by cross-tubular joint member 120 and elbow 122, one set shown. Intermediate the ends of tubular members 111-116 and the ends of gun support bars 90-96 are T-joint tubular connectors 130, 132 which secure the separable intermediate support struts 26-32 and separable corner supports 18-24.

Figure 5:
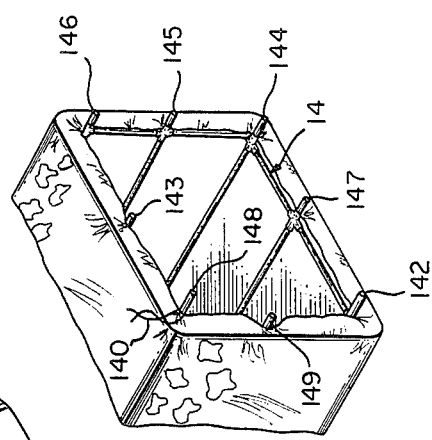
FIG. 5 is a view of the bottom of the blind and shows the manner in which the blind cover is secured to the bottom frame.

It will be seen that the upper frame 16 and lower frame 14 are thus separably connected by the corner posts 18-24 and the struts 26-32. This arrangement facilitates ease in transporting the blind to the field site. Once at the field site, the upper and lower frames 16 and 14 are assembled together via the struts 18-24 and 26-32, and the cover 36 installed quickly and easily. The cover, it will be seen, has a tie member or drawstring 140 around its bottom, FIG. 5, to secure the cover firmly to the frame. The bottom end protrusions 142, 144, 146 and 148 may be used to pierce the ground and thus serve as anchor members for the blind. Intermediate extensions 143, 145, 147 and 149 also function as ground piercing members.

Figure 4:
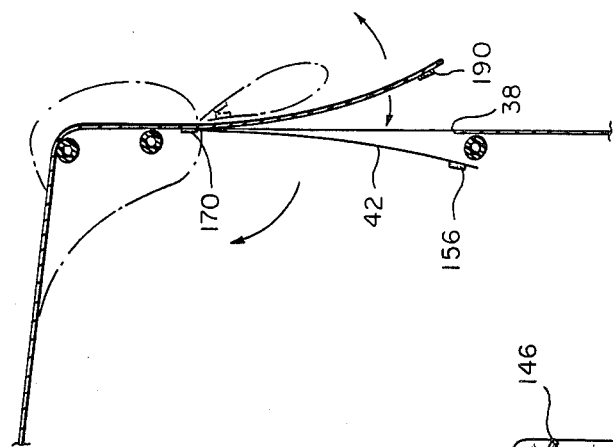
FIG. 4 is an enlarged sectional side view taken along the line 4—4 of FIG. 3 and shows the inside and outside flap members in the window opening.
Figure 7:
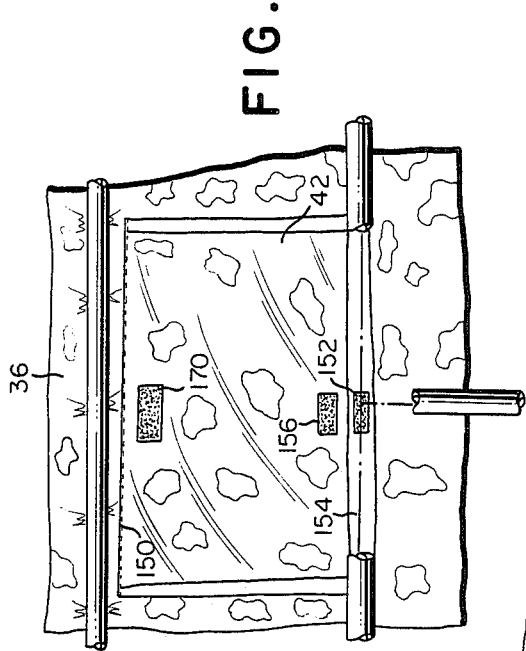
FIG. 7 is an inside view of the blind with both flaps fully closed.
Figure 8:
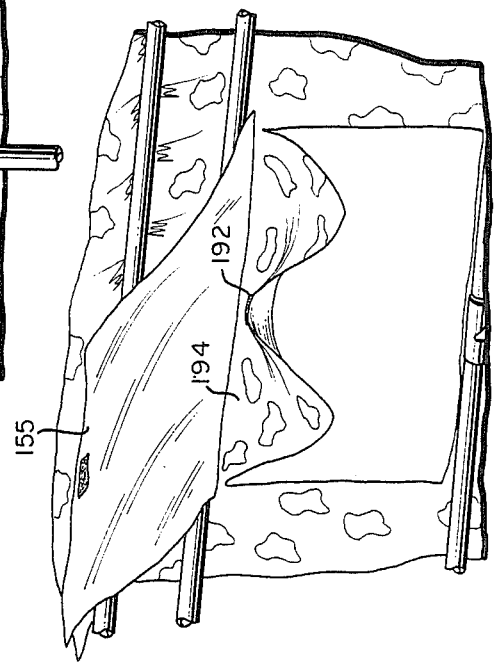
FIG. 8 is an inside view of the blind with the outer flap half open and the inner clear plastic flap fully open.

FIGS. 1, 4 and 8 show in more detail the window openings 38 and flap members 42 and 44. FIG. 4 is a view taken along the line 4—4 of FIG. 3 and shows a window opening 38 of general rectangular conformation. A clear plastic flap 42 is secured along an upper edge 150, FIG. 7, to the inside of the cover 36 and hangs downwardly to cover the window opening. A suitable fastening means such as velcro 152 is secured to the bottom edge of the flap 42 and cooperates with a similar fastening means 156 on the adjacent edge portion 154 of the cover to provide means to hold the flap 42 firmly against the cover 36. This construction ensures that rain will not enter through the window openings.

It is important that the plastic flap 42 be vertically adjustable in the window opening to allow for protrusion of the hunter's gun barrel. To this end, a fastening strip 170 is positioned on a central axis on the flap 42 near the upper edge 150. It will thus be seen that the flap 42 may be folded in half and the strips 156 and 170 function together to hold the flap in a half-open position. On the other hand, the plastic flap 42 may be fully opened, FIG. 8, by wrapping the end 155 about the support members 46-52.

Figure 3:
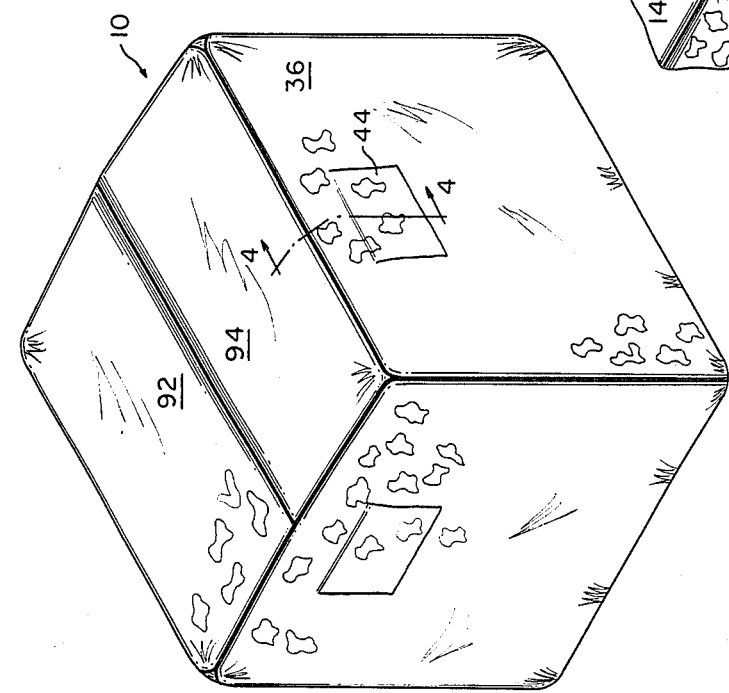
FIG. 3 is similar to FIG. 1 and shows the window opening fully closed by the flaps.
Figure 6:
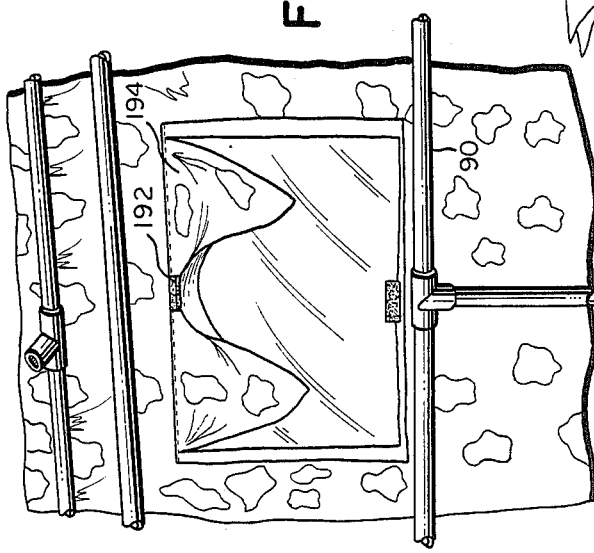
FIG. 6 is a view from the inside of the blind showing the gun support bar below the outer flap which is in a half-open position and the inner clear plastic flap fully closed.

Similarly, the outside opaque flap 44 may be adjusted to a fully closed position, FIG. 3, and to a half-open position, FIGS. 6 and 8, by means of a fastening strip 190 near the bottom edge of the flap and a cooperating fastening strip 92 on the same side of the flap but positioned near the upper edge 194. By this arrangement, the outer flap 44 may be held in fully closed position, FIG. 3, or in a half-open position, FIGS. 6 and 8. The flap 44 may be extended to a fully open position, FIG. 4, by raising it to a position on top of the cover 36. Optional fastening means may be provided to hold the flap in this position.

The arrangement of the inner and out flaps 42 and 44 provide the hunter with the means to ensure against rain entering the blind and with optimum view of game and attaining a shooting stance unobstructed by downwardly dangling flaps.

The gun bars 90-96 provide a support for the gun barrel during aiming and shooting. During moments of inactivity, the hunter may relax his grip on the gun by leaning the barrel against the gun bars. This lessens the fatigue and stress normally experienced by hunters whose blinds do not have the gun support bars of this invention.

While the invention has been described with regard to a particular embodiment thereof, it will be understood by those skilled in the art to which this invention pertains, that numerous changes may be made in the construction of the invention without departing from the extent and scope thereof.

What I claim is:

1. A hunting blind comprising:
   an upper frame including a peripheral frame structure, top reinforcing side members and a cross strut;
   gun support bars attached to and spaced below said upper frame;
   a bottom frame structure separably attached to said upper frame;
   a cover extending about said upper frame and said lower frame;
   said cover having a plurality of window openings; and
   a flap on the inside and a flap on the outside of said window openings to open or close said openings at the discretion of a hunter occupying said blind.

2. A hunting blind comprising:
   an upper frame including an integral peripheral frame, top reinforcing side members above said peripheral frame, and a cross strut attached to said top reinforcing side members;
   gun support bars attached to and spaced downwardly from said peripheral frame by corner tubular members;
   a bottom frame structure separably attached to said upper frame;
   a cover extending about said upper and lower frames and secured to the frame by suitable tie means;
   said covering having window openings in each side thereof positioned between the upper frame and the gun support bars;
   flap means on the inside of said cover;
   flap means on the outside of said cover; and
   said flap means vertically adjustable in said window opening.

3. A hunting blind comprising:
   an upper frame including a plurality of tubular members joined together by tubular cross-type connectors and elbow joints to form a unitary peripheral frame, top reinforcing side members above said peripheral frame and a cross strut secured in T-type tubular connectors to said top side members;
   gun support bars attached to and spaced downwardly from said upper frame by tubular corner members attached to cross-type tubular connectors and elbow joint connectors;
   a bottom frame, including a plurality of tubular members joined together by tubular cross-type connectors and elbow joints to form a peripheral frame;
   said upper frame and said bottom frame separably attached to each other by corner tubular members;
   a cover extending about said upper and said lower frames and secured thereto by tie members;
   said cover having window openings on the sides thereof positioned between the upper frame and the gun support bars;
   a clear plastic flap on the outside of the cover to close said window opening; and said flaps vertically adjustable to permit a hunter to extend a gun barrel in unobstructed fashion.

4. A hunting blind according to claim 1, wherein: said flap on the inside of said window opening has fastening means to fasten said flap in a fully closed position or half-open position.

5. A hunting blind according to claim 1, wherein: said flap on the outside of said window opening has fastening means to fasten said flaps in fully closed position or half-open position.

6. A hunting blind according to claim 4, wherein: said fastening means comprises strips attached to an edge of the cover and to an edge of the flap whereby the flap may be fully closed or half opened.

7. A hunting blind according to claim 5, wherein: said fastening means comprises strips inside of the clear flaps and attached to the opposite edges of the flaps whereby said flaps may be folded inwardly and secured together in a half-open position.

8. A hunting blind according to claim 1, wherein: said gun support bars are positioned below said window openings and function to support the barrel of a gun either during shooting or at rest.

9. A hunting blind according to claim 1, wherein: said upper and lower frames and said corner tubular members are collapsible to form a compact portable structure easily transported by a hunter or in a vehicle.

10. A hunting blind according to claim 1, wherein: said tubular members, connectors and corner posts are made of light-weight 11. A hunting blind according to claim 2, wherein: anchor means is on said bottom frame for anchoring said blind to the ground.

12. A hunting blind comprising:
an upper frame including a peripheral frame structure, top reinforcing side members and a cross strut;
a bottom frame structure separably attached to said upper frame;
a cover extending about said upper frame and said lower frame;
said cover having a plurality of window openings in the sides thereof; and
gun support bars attached to and spaced below said upper frame and said window openings in a position to support a gun when the gun is extended through a window opening, thereby facilitating aiming.

13. A hunting blind comprising:
an upper frame including a peripheral frame structure, top reinforcing side members and a cross strut;
a bottom frame structure separably attached to said upper frame;
a cover extending about said upper frame and said lower frame;
said cover having a plurality of window openings; and
a transparent flap on the inside and an opaque flap on the outside of said window openings to open or close said openings at the discretion of a hunter occupying said blind, said flaps having fastening means thereon to enable either or both of said flaps to be fully or partially opened and closed independently of each other, whereby the transparent inner flap may be left closed for weather protection while the opaque outer flap is opened for visibility, or both flaps may be fully or partially opened for aiming and shooting.

* * * * *